Oct. 17, 1939.　　　P. E. KUHL　　　2,176,741
LIQUID LEVEL CONTROL
Filed April 22, 1936　　　4 Sheets-Sheet 1

Paul E. Kuhl Inventor
By P. L. Young Attorney

Oct. 17, 1939.                P. E. KUHL                2,176,741
                         LIQUID LEVEL CONTROL
           Filed April 22, 1936            4 Sheets—Sheet 4

Paul E. Kuhl Inventor
By P. L. Young Attorney

Patented Oct. 17, 1939

2,176,741

UNITED STATES PATENT OFFICE 2,176,741

LIQUID LEVEL CONTROL

Paul E. Kuhl, Cranford, N. J., assignor to Standard Oil Development Company, a corporation of Delaware Application April 22, 1936, Serial No. 75,665

9 Claims. (Cl. 137—68)

This invention relates to a level control for a container. This application is a continuation in part of my previously filed application Serial No. 423,366 entitled "Liquid level control", filed January 25, 1930.

It is frequently necessary to keep the liquid level constant in a container which receives liquid feed from some source and in turn discharges it to another container. It is an object of this invention to obtain a uniform rate of change of flow through the discharge from the container directly related to the rate of change of level. Another object is to modify the rate of flow through the discharge line as little as possible while permitting a slight variation in the level of liquid in the container.

Other objects will be apparent from the specification and from the accompanying drawings, in which latter—

Figure 5:
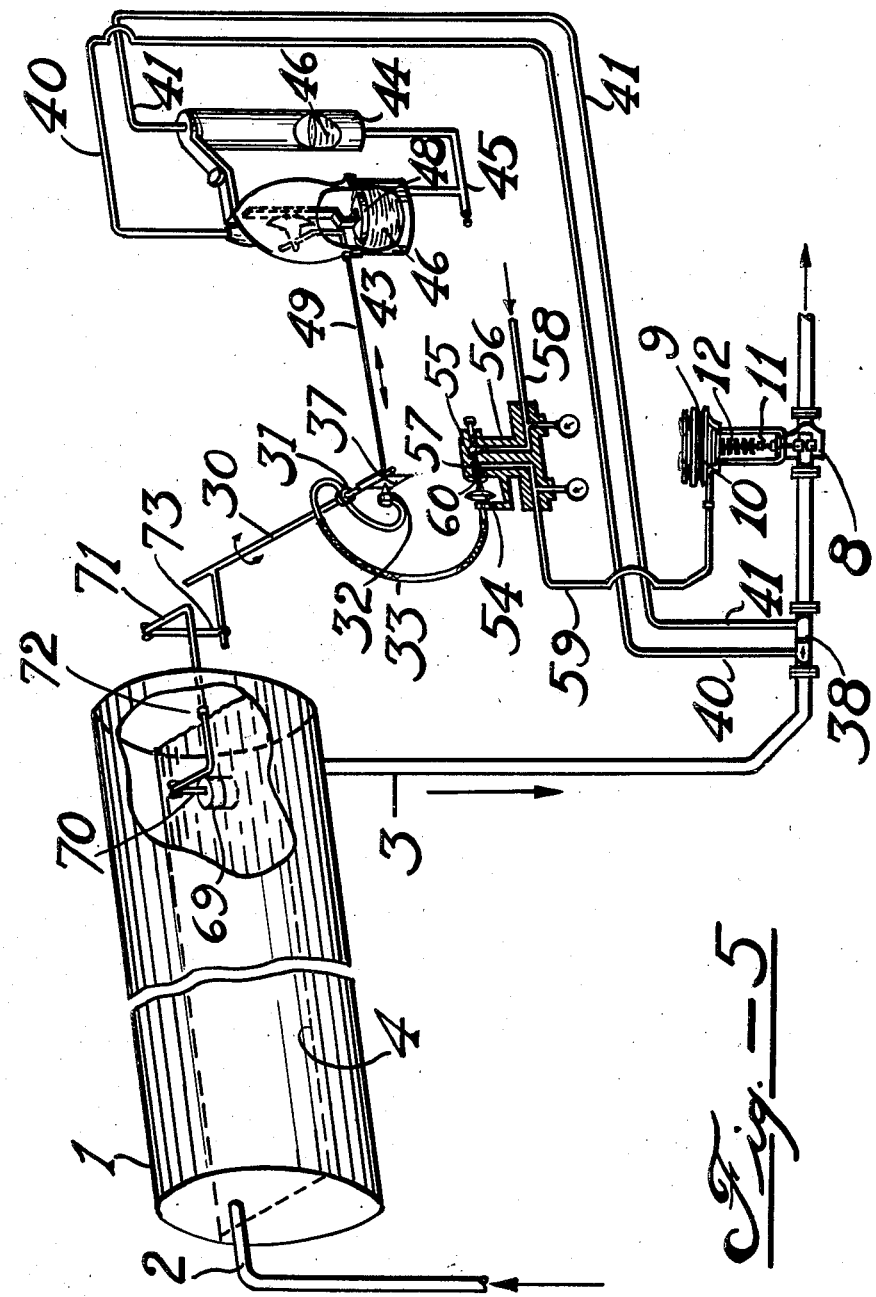
Figure 6:
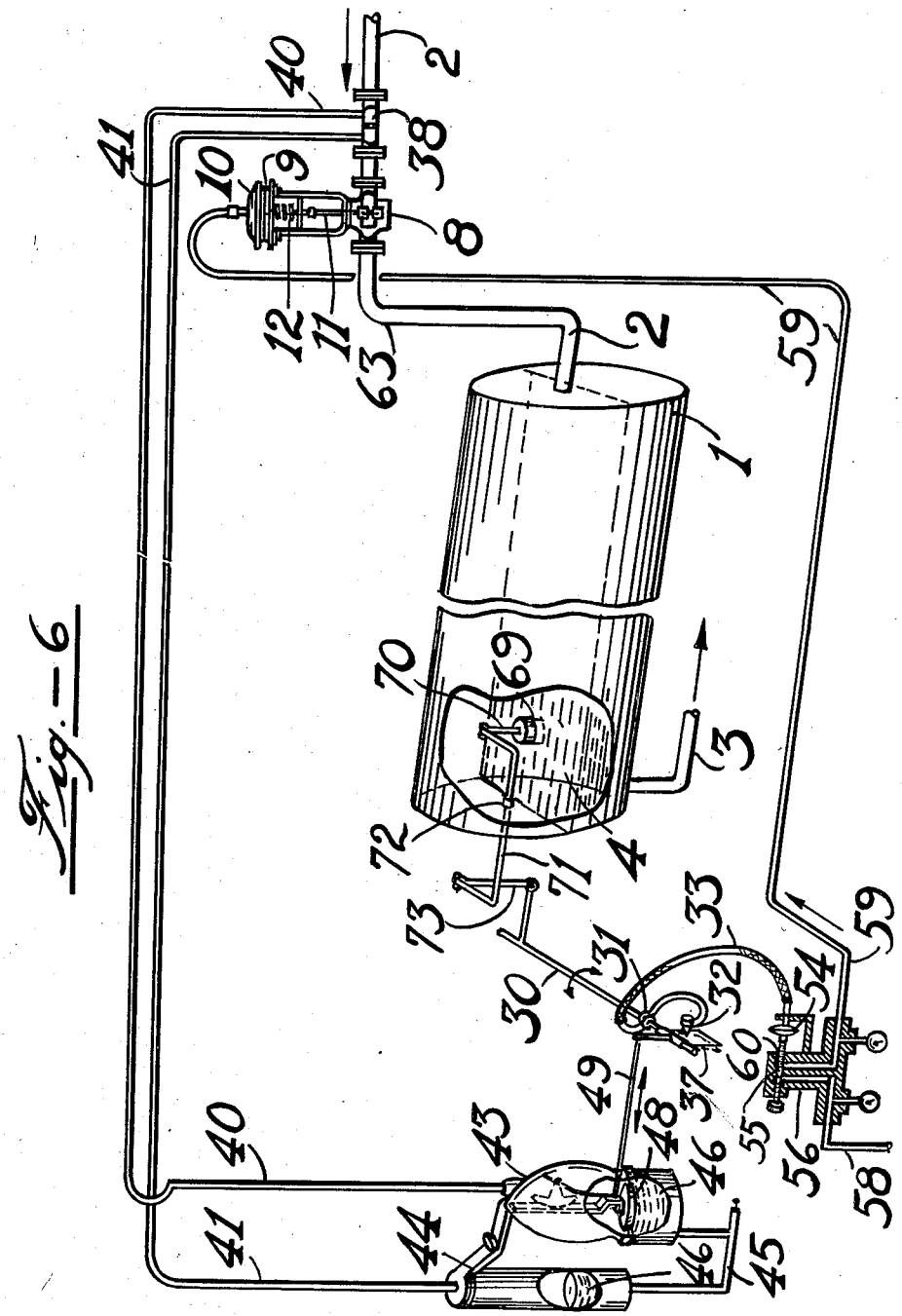

Fig. 5 is a diagrammatic perspective view of another form of the invention, in which float actuated means are provided responsive to variations in the level of liquid in the container and the fluid pressure valve and orifice plate are disposed in the outlet conduit from the container, and Fig. 6 is a diagrammatic perspective view of the form of invention illustrated in Fig. 5 in which the fluid pressure valve and orifice plate are disposed in the inlet to the container.

Figure 1:
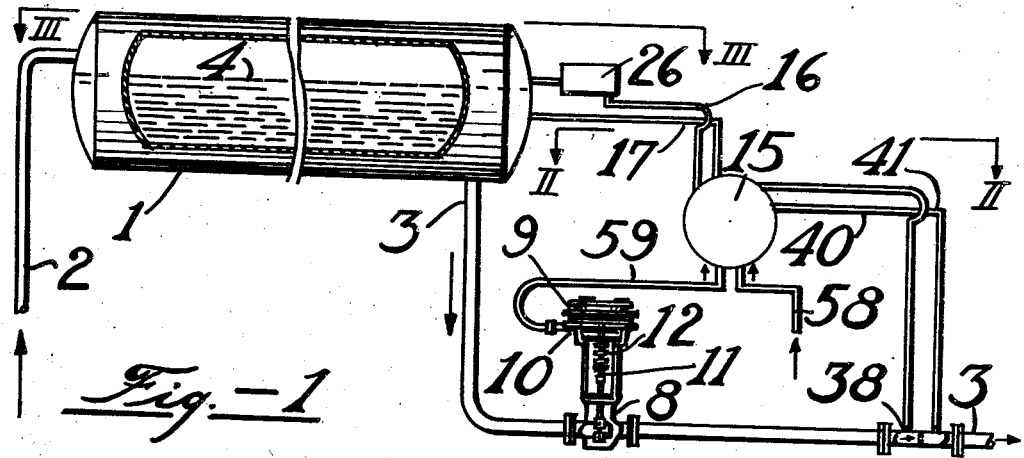
Fig. 1 is a diagrammatic side elevational view partly in section of a preferred form of apparatus for carrying out the invention, showing a fluid pressure valve and an orifice plate in the outlet conduit leading from the container.
Figure 3:
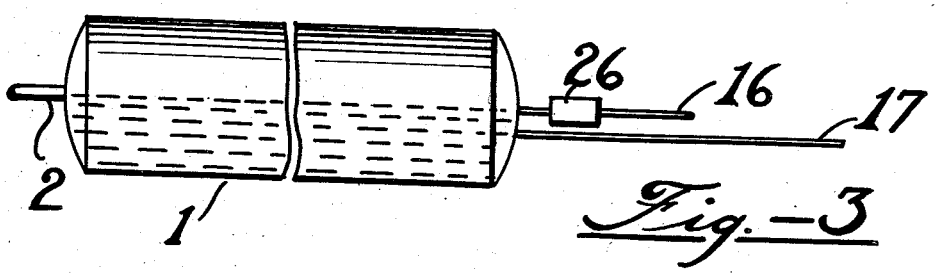
Fig. 3 is a detail view taken along the line III—III of Fig. 1.
Figure 2:
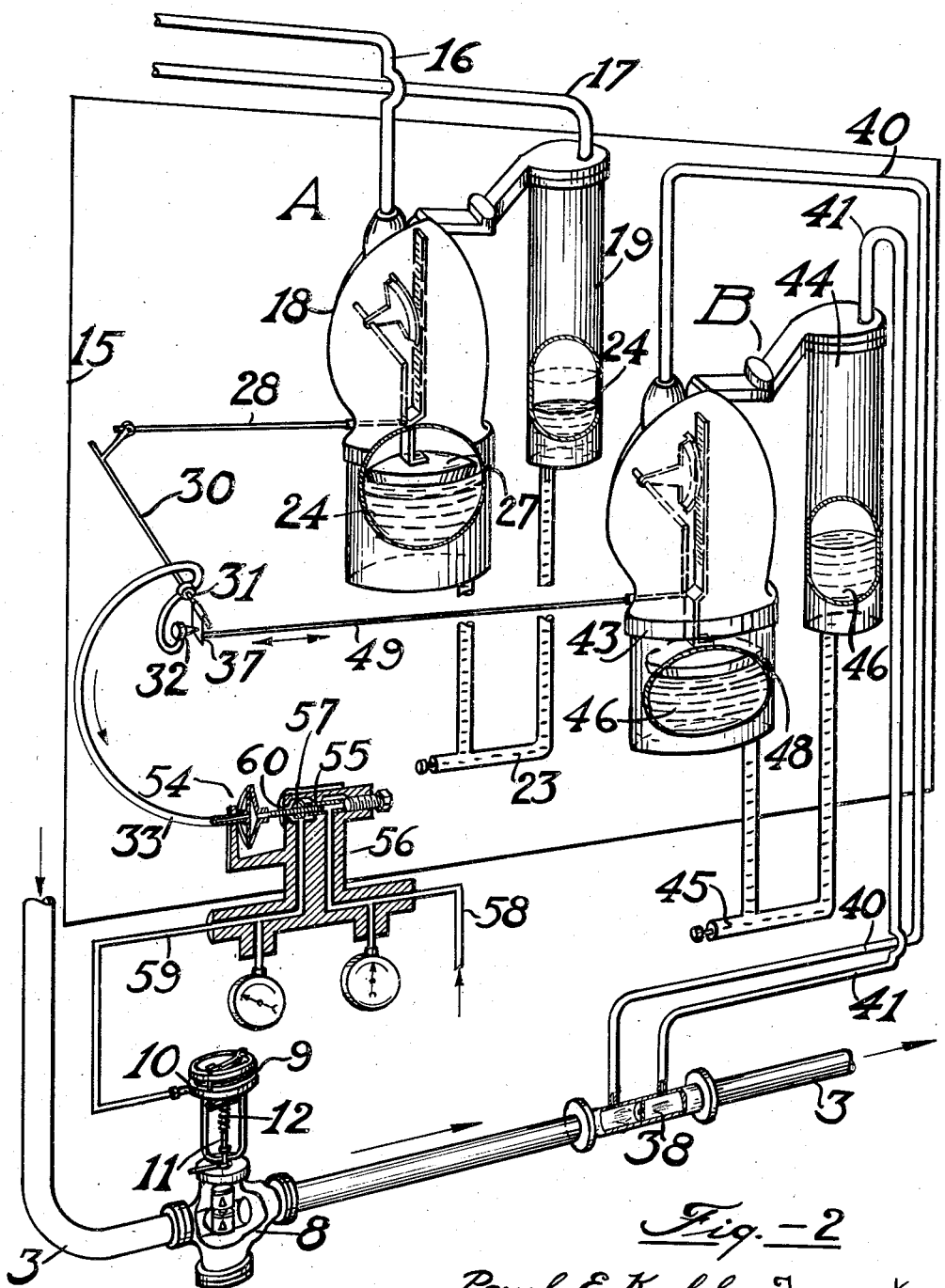
Fig. 2 is a view taken along the line II—II of Fig. 1 showing a diagrammatic organization view of the elements of the ratio flow controller and their connection to the discharge line leading from the container.

Referring particularly to Figs. 1 to 3 inclusive of the drawings, reference numeral 1 designates a container, such as a still used in the distillation of hydrocarbon oil or an accumulator or the like, which receives feed through an inlet conduit 2. The liquid is discharged from the container 1 through a discharge conduit 3. Dotted line 4 designates the liquid level which is to be controlled. A fluid pressure valve 8, in the embodiment illustrated in Figs. 1 to 3 inclusive, is disposed in the discharge conduit 3. The valve 8 is a diaphragm control valve comprising a diaphragm 9 which extends transversely across a fluid-tight casing 10. The valve 8 is connected by means of a rod 11 with diaphragm 9. The valve 8 is normally maintained closed by means of a helical spring 12. The valve is actuated by means of compressed air or other fluid, in a way to be later described.

The rate of flow of liquid from the container 1 is controlled by means of a ratio flow controller 15. The ratio flow controller 15 includes a manometer A. Variations in the liquid level in the container 1 are communicated through lines 16 and 17 to the manometer A. The manometer comprises tubular legs 18 and 19, the upper ends of which are connected to the lines 16 and 17 respectively. The bottoms of the tubular legs are connected by means of a conduit 23. Liquid 24, such as mercury, fills the lower portion of the legs 18 and 19, as well as the conduit 23. The line 17 leads from the container 1 below the normal level of liquid in the container 1, and the line 16 leads from the container 1 above the normal level of liquid in the container. The lines 16 and 17, as well as the space above the mercury in legs 18 and 19, are filled with the same liquid as is disposed in the container 1. The varying head of liquid in the container 1 maintains a varying pressure through the lines 16 and 17 upon the mercury in the manometer, thereby altering the length of the column of mercury in the legs. A vessel 26 is disposed in the line 16 and provides a vapor space in which vapors from the vapor spaces of the container 1 can be contained in order to maintain a constant head of liquid in the line 16. A float 27 is provided in the leg 18 resting upon the column of mercury in the leg. The float 27 is connected by means of links 28 to a shaft 30 rotatably mounted. The shaft carries a nozzle 32 connected with a tubular conduit 33 and fixed to the shaft at 31 so as to be rotated by the shaft. Compressed air is adapted to be discharged through the nozzle 32, in a manner to be later described, and the flow of the compressed air through the nozzle 32 is controlled by means of a flapper 37, to be later described. Increase in the head of liquid in the container 1 increases the pressure upon the mercury in the leg 19, thereby raising the column of mercury in the leg 18 and rotating the nozzle 32 clockwise, as viewed in Fig. 2, by means of the float 27. Alternatively, reduction in the head of liquid in the container 1 decreases the pressure upon the column of mercury in the leg 19 and thereby decreases the length of the column of mercury in the leg 18, whereby the float rotates the nozzle 32 in a counter-clockwise direction as viewed in Fig. 2.

The escape of the compressed air from the nozzle 32 is obstructed adjustably by means of a flapper 37 controlled by means to appraise the flow from the container 1. The means to appraise the flow from the container 1 comprises a manometer B connected with the discharge line 3, as will now be described. The discharge line 3 is provided with the diaphragm control valve 8. An orifice plate 38 constituting a constriction is disposed in the discharge line 3 on the delivery side of the valve 8, as illustrated, although it will be understood that it can be placed on either side of the valve 8. The orifice in the plate 38 is so proportioned with respect to the size of the container 1 that for a given pressure differential in the container 1 there will be a given pressure differential across the orifice. The pressure differential across the orifice is utilized to alter the position of the flapper 37 as follows. Lines 40 and 41 lead from the line 3 on opposite sides of the orifice plate 38 and open into the upper portions of legs 43 and 44 respectively of a manometer B. The bottoms of the legs 43 and 44 are connected by means of a conduit 45. Liquid 46, such as mercury, is disposed in the tubular legs and in the connecting line 45 so as to partially fill the legs. The lines 40 and 41 and the portion of the legs 43 and 44 above the mercury are maintained filled with the liquid flowing through the discharge line 3. A float 48 is disposed in the leg 43 floating upon the mercury. The float 48 is connected by means of a series of connecting links 49 with the flapper 37. The flapper 37 is mounted on shaft 30 but is free to rotate about its axis independently of the rotation of shaft 30. The flapper 37 has a relatively broad surface which faces the nozzle 32. Increase in the amount of liquid discharged through the line 3 causes an increase in the differential pressure of the liquid across the orifice plate 38. This increase in differential pressure is communicated through lines 40 and 41 to the mercury in the manometer, with the result that the column of mercury is depressed in leg 43. The float 48 is therefore lowered in leg 43, thereby moving the flapper 37 to the left as viewed in Fig. 2. Alternatively, decrease in the differential pressure across the orifice plate 38 is communicated to the mercury in the manometer elevating the column of mercury in the leg 43 and forcing the flapper 37 to the right, as viewed in Fig. 2. The flapper 37 is held continuously in a balanced position with respect to the nozzle 32 in a manner to be described later.

The variation in the obstruction to the compressed air issuing from the nozzle 32 is caused to influence the valve 8 by the following arrangement of parts. The flexible conduit 33 leading from the nozzle 32 opens through one of the plates of a bellows 54. The other plate is connected to the tubular valve stem 55 of a three-way valve 56. The valve stem 55 carries a valve head 57 and is adapted to be reciprocated in the valve to alternately open communication between an air conduit 59 and an air inlet 58 or a vent to the atmosphere 60, respectively. A portion of the air entering at 58 escapes through valve stem 55, the conduit 33 and nozzle 32.

The conduit 59 opens into the casing 10 of the valve 8 below the diaphragm 9. Admission of compressed air under pressure through the conduit 59 opens the valve 8 against the pressure of the spring 12. The compressed air is preferably introduced through the line 58 under a pressure of approximately 15 pounds per square inch. The bellows 54 is so mounted that alteration of the pressure of the fluid within the bellows, with resultant collapse or expansion of the bellows, causes change of position of the valve stem 55.

When the instrument is in operation controlling the flow of liquid, the nozzle 32 and flapper 37 are substantially in contact. Should the level begin to fall in the container 1, the series of reactions previously described would cause the nozzle 32 to move toward the flapper 37. Escape of the compressed air through the nozzle 32 is thereby obstructed, with a result that pressure is built up in the line 33 and the bellows 54 are expanded, thereby moving the valve stem 55 to the right, as viewed in Fig. 2, to close communication of the inlet 58 through the line 59 leading to the valve 8, and permit air to escape from the line 59 to the atmosphere. The reduction in pressure of the air in the line 59 permits the spring 12 of the valve 8 to tend to close the valve, thereby reducing the amount of liquid discharged through the line 3. Increase in the head of liquid in the container 1 withdraws the outlet of nozzle 32 from the flapper 37, thereby increasing the freedom with which the air escapes from the nozzle 32. The pressure upon the air within the bellows 54 is consequently decreased with a result that the valve stem 55 is drawn toward the left, as viewed in Fig. 2. Communication is open thereby in valve 56 between the inlet 58 and the line 59, whereby the compressed air is caused to open the valve 8 to permit the discharge of increased quantities of liquid from the container 1. As the flow through the orifice plate 38 becomes increased, the differential pressure on the manometer B is increased and the flapper 37 is moved toward the nozzle 32 increasing the pressure in the conduit 33. In this way, the series of reactions described above keeps the nozzle 32 and the flapper 37 in step, maintaining definite relationship between them. Since the nozzle 32 and the flapper 37 remain substantially in contact, the flow through the discharge line 3 must be such as to give a differential pressure across the orifice plate 38 proportional to the level in the container 1.

By the construction described, changes in the level of liquid in the container actuate the manometers A and B a graduated amount in order to open or close the valve 8, as required. The movements of the flapper 37 and nozzle 32 are coordinated to such an extent that they reach a balanced position and the valve 8 is held in a given position during changes in liquid level in the container 1. The valve 8 is opened or closed with sufficient sensitiveness to accurately maintain a predetermined rate of flow through the line 3 with respect to the liquid level 4 in the container 1. An abrupt change of liquid level in the container 1 produces a gradual change of rate of flow from the container.

Figure 4:
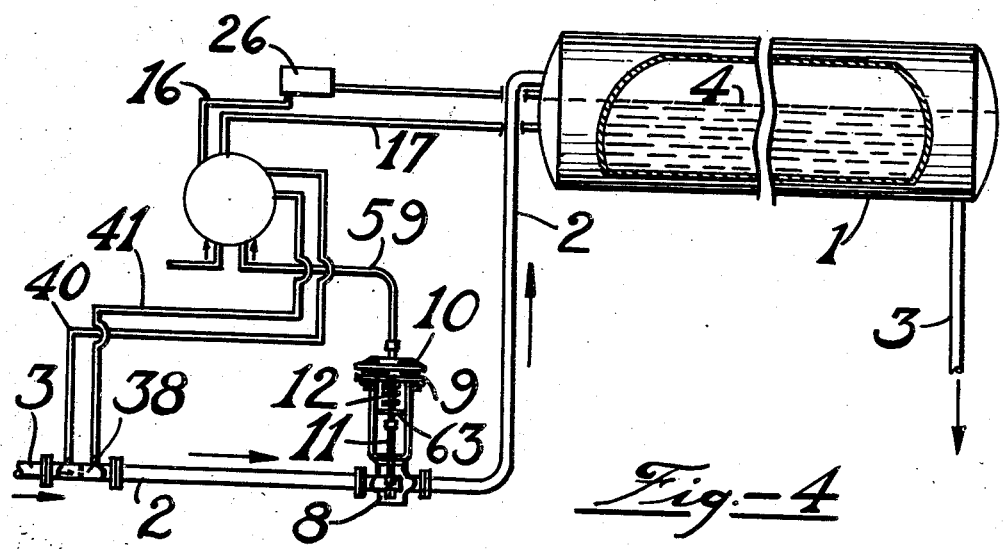
Fig. 4 is a diagrammatic side elevational view partly in section of a modified form of apparatus, in which the fluid pressure valve and the orifice plate are disposed in the inlet conduit of the container.

In the modification of the invention illustrated in Fig. 4, the fluid pressure valve 8 and the orifice plate 38 are disposed in the inlet conduit 2. The valve 8 is constructed exactly as described in connection with Figs. 1 to 3 inclusive, except that the air line or conduit 59 opens into the casing 10 above the diaphragm 9. The helical spring 12 functions as a compression spring, bearing at one end against a frame 63 and at its other end against the diaphragm 9. The spring 12 therefore in Fig. 4 normally functions to maintain the valve 8 in open position. The air pressure introduced into the casing 10 through the line 59 functions to close the valve 8. The other elements of the apparatus illustrated in Fig. 4 are identical with those illustrated in Figs. 1 to 3 inclusive, except that linkage 49 is altered to cause the flapper 37 to move to the left when the flow through 38 is decreased, and like reference numerals have been applied to like parts.

Referring to Fig. 5, a modified form of control device actuated by variation of the liquid level in the container is illustrated, in which the position of the nozzle 32 is controlled by means of a float 69. The float 69 rests upon the liquid in the container 1 and is connected through a link 70 at one end of a rocker arm 71 which is mounted for rotation at 72 in the wall of the container 1. The other end of the rocker arm 71 is connected through a link 73 to the shaft 30. Consequently, rise or fall of the liquid level in the container 1 causes rotation of the shaft 30 which carries the nozzle 32, and moves the nozzle 32 toward or from the flapper 37. Fluid pressure valve 8 is disposed in the outlet conduit 3 of the container 1 and its operation is controlled by variation in the relative positions of the nozzle 32 and flapper 37, by the same arrangement of parts as was described in connection with Figs. 1 to 3 inclusive, and like reference numerals have been applied to like parts.

Referring to Fig. 6, the structure of Fig. 5 is illustrated but with the fluid pressure valve 8 and the orifice plate 38 disposed in the inlet conduit 2. In this figure the position of the nozzle 32 is alternately controlled, exactly as was described in connection with Fig. 5. The valve 8 is maintained open by the compression spring 12 until increase of fluid pressure in the line 59 closes the valve as was described in connection with Fig. 4.

By the construction described, the rate of flow is controlled with respect to the liquid level by deriving a differential pressure from the discharge of the liquid from the container, deriving a second differential pressure by variations in the level of liquid in the container, combining the two pressures and regulating the flow of liquid through the container by the combined pressures. The differential pressure derived by variations in the level of liquid in the container may be a static measurement of pressure. The differential pressure by variations in the level of liquid in the container is derived by the weight of a column of the liquid which extends to the liquid level. The static measurement of pressure due to variations in the liquid level in the container may be derived alternatively by float actuated means responsive to the level of liquid in the container. Either the liquid inflow into the container or the liquid outflow from the container is regulated by the combined differential pressures.

By the construction described, a uniform change of the discharge rate from the container is provided, which is proportional to the change in the height of the liquid level. It will be understood that the various parts of the apparatus will be designed according to the conditions under which it is to be used. For example, when the maximum variation of the feed is from 10,000 to 20,000 gallons per hour and the maximum permissible level variation is two inches, the mechanism will be designed so that a two inch change in liquid level at 10,000 gallons per hour rate of discharge will increase the rate of discharge to 20,000 gallons per hour.

The following example will serve to illustrate an application of this invention. Crude petroleum oil is topped continuously in a 1000 barrel shell still. The feed is pumped into the bubble tower at the rate of 15,700 barrels per day. A temperature of 250° F. is maintained on the still, which distills off about 7% of the crude oil, leaving a bottoms of about 34.5° A. P. I.

It is found to be advantageous to maintain a constant level in the still and a uniform rate at which the oil is pumped out of the still. A centrifugal pump is used to discharge the bottoms from the still through the bottoms heat exchangers. The subject matter of the present invention is used to maintain the level of liquid in the still. An orifice plate 38 is installed in the bottoms line between the pumps and the bottoms exchangers. The orifice is of a size that at 100 inches of water differential, 17,500 barrels per day of oil will pass through the orifice. A control device actuated by variation of the liquid level in the container, such as has been described in Figs. 1 to 4 inclusive, was equipped with a manometer having a range of 20 inches of water and a manometer having a range of 100 inches of water. The 20 inch manometer was connected to the still and is actuated by the variation in the level of liquid in the still and the 100 inch manometer is actuated by the differential pressure across the orifice plate.

Then when 14,500 barrels per day of oil is passed through the orifice the differential across the orifice plate will be 68 inches of water and the level of oil in the still will be below the top connection to the still by an amount equivalent in head to $$\frac{100-68}{100} \times 20 = 6.4 \text{ inches of water}$$

While the invention has been described as utilizing a control valve 8, it will be understood that a pump may be inserted in the discharge line and that fluid pressure valve 8 may be utilized to control the amount of steam admitted to actuate the pump.

Various changes and alternate arrangements may be made within the scope of the appended claims in which it is my intention to claim all novelty inherent in the art as broadly as the prior art permits.

I claim:

1. In a level control for a container, an inlet conduit into the container, an outlet conduit from the container, means for controlling the flow through the container comprising a valve operated by gas pressure and disposed in one of the conduits, a line communicating with the container below the normal variation in liquid level, a line communicating with the container above the normal variation in liquid level, a liquid manometer, the lines communicating with opposite legs of the liquid manometer which is actuated by pressure differences in the lines, the conduit in which the valve is located having a constriction, a second liquid manometer connected to said conduit on opposite sides of the constriction and actuated by the pressure difference set up by the constriction, a pilot valve for controlling the supply of gas to the gas pressure operated valve, and means controlled by the liquid manometers for actuating the pilot valve whereby the rate of flow of liquid through the conduit as measured by the differential across the constriction is controlled in absolute relation to the liquid level.

2. In a level control for a container, an inlet conduit into the container, an outlet conduit from the container, means for controlling the flow through the container, such controlling means comprising a valve operated by gas pressure and disposed in one of the conduits, a line communicating with the container below the normal variation in liquid level, a line communicating with the container above the normal variation in liquid level, a differential pressure responsive device, the lines communicating with the device, the conduit in which the valve is located having a constriction, a liquid manometer connected to said conduit on opposite sides of the constriction and actuated by the pressure difference set up by the constriction, a pilot valve for controlling the supply of fluid to the gas pressure operated valve, and means controlled by the differential pressure responsive device and the manometer for actuating the pilot valve whereby the rate of flow of liquid through the conduit is controlled in absolute relation to the liquid level.

3. In a level control for a container, an inlet conduit into the container, an outlet conduit from the container, means for controlling the flow through the container comprising a fluid pressure operated valve in one of the conduits, float actuated means within the container responsive to variations in liquid level in the container, the conduit in which the valve is located having a constriction, a liquid manometer connected to the conduit in which the valve is located on opposite sides of the constriction and responsive to pressure difference set up by the constriction, an air nozzle and a baffle plate mounted for relative movement toward each other the relative positions of which are controlled by the float actuated means and manometer respectively, a pilot valve operatively connected with the nozzle and baffle plate, such pilot valve supplying air under pressure to the fluid pressure operated valve so as to maintain a definite relationship between the float actuated means and the pressure on the manometer.

4. In a level control for a container, an inlet conduit into the container, an outlet conduit from the container, means for controlling the flow through the container comprising a fluid pressure operated valve in one of the conduits, means associated with the container responsive to variations in liquid level in the container, the conduit in which the valve is located having a constriction, means responsive to pressure differences set up by the constriction, an air nozzle and baffle plate mounted for relative movement toward each other, the relative positions of which are controlled by the level responsive means and pressure responsive means, respectively, a pilot valve operatively connected with the nozzle and baffle plate, such pilot valve supplying air under pressure to the fluid pressure operated valve so as to maintain a definite relationship between the level responsive means and the pressure responsive means.

5. In a level control for a container, an inlet conduit into the container, an outlet conduit from the container, means for controlling the flow through the container comprising a fluid pressure operated valve in one of the conduits, means associated with the container responsive to variations in liquid level in the container, the conduit in which the valve is located having a constriction, a liquid manometer connected to the conduit in which the valve is located on opposite sides of the constriction and responsive to pressure differences set up by the constriction, an air nozzle and baffle plate mounted for relative movement towards each other, the relative positions of which are controlled by the level responsive means and manometer respectively, a pilot valve operatively connected with the nozzle and baffle plate, such pilot valve supplying air under pressure to the fluid pressure operated valve so as to maintain a definite relationship between the level responsive means and the pressure on the manometer.

6. In a level control for a container, an inlet conduit into the container, an outlet conduit from the container, means for controlling the flow through the container comprising a fluid operated pressure valve in one of the conduits, a line communicating with the container below the normal variation in liquid level, a line communicating with the container above the normal variation of liquid level, a liquid manometer, the lines communicating with opposite legs of the liquid manometer, which is actuated by pressure differences in the lines, the conduit in which the valve is located having a constriction, a liquid manometer connected to the conduit in which the valve is located on opposite sides of the constriction, and responsive to pressure difference set up by the constriction, an air nozzle and a baffle plate mounted for relative movement toward each other, the relative positions of which are controlled by the manometers respectively, a pilot valve operatively connected with the nozzle and baffle plate, such pilot valve supplying air under pressure to the fluid pressure operated valve so as to maintain a definite relationship between the pressures on the respective manometers.

7. In a level control for a container, an inlet conduit into the container, an outlet conduit from the container, means for controlling the flow through the container, such controlling means comprising a valve operated by gas pressure and disposed in one of the conduits, means associated with the container responsive to variations in liquid level in the container, the conduit in which the valve is located having a constriction, means responsive to pressure difference set up in the conduit by the constriction, a pilot valve for controlling the supply of fluid to the gas pressure operated valve, and means controlled by the level responsive means and the pressure responsive means for actuating the pilot valve whereby the rate of flow of liquid through the conduit is controlled in absolute relation to the liquid level.

8. In a level control for a container, an inlet conduit into the container, an outlet conduit from the container, means for controlling the flow through the container, such controlling means comprising a valve operated by gas pressure and disposed in one of the conduits, means associated with the container responsive to variations in liquid level in the container, the conduit in which the valve is located having a constriction, a liquid manometer connected to said conduit on opposite sides of the constriction and actuated by the pressure difference set up by the constriction, a pilot valve for controlling the supply of fluid to the gas pressure operated valve, and means controlled by the level responsive means and the manometer for actuating the pilot valve whereby the rate of flow of liquid through the conduit is controlled in absolute relation to the liquid level.

9. In a level control for a container, an inlet conduit into the container, an outlet conduit from the container, means for controlling the flow through the container comprising a valve operated by gas pressure and disposed in one of the conduits, float actuated means associated with the container responsive to variations in liquid level in the container, the conduit in which the valve is located having a constriction, a liquid manometer connected to said conduit on opposite sides of the constriction and actuated by the pressure difference set up by the constriction, a pilot valve for controlling the supply of gas to the gas pressure operated valve, and means controlled by the float actuated means and the manometer for actuating the pilot valve whereby the rate of flow of liquid through the conduit, as measured by the differential across the constriction, is controlled in absolute relationship to the liquid level.

PAUL E. KUHL.